United States Patent
Mo et al.

(10) Patent No.: US 8,345,179 B2
(45) Date of Patent: Jan. 1, 2013

(54) FLAT PANEL DISPLAY MODULE

(75) Inventors: Yao-An Mo, Hsin-Chu (TW);
Chieh-Jen Cheng, Hsin-Chu (TW);
Chia-Chang Yang, Hsin-Chu (TW);
Hsin-An Chang, Hsin-Chu (TW);
Chia-Hun Cheng, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 391 days.

(21) Appl. No.: 12/581,351

(22) Filed: Oct. 19, 2009

(65) Prior Publication Data

US 2011/0019121 A1    Jan. 27, 2011

(30) Foreign Application Priority Data

Jul. 24, 2009 (TW) ................. 98125073 A

(51) Int. Cl.
*G02F 1/1333* (2006.01)
(52) U.S. Cl. .......................................... 349/58
(58) Field of Classification Search ........ 349/58
See application file for complete search history.

(56) References Cited

U.S. PATENT DOCUMENTS

| | | | |
|---|---|---|---|
| 6,515,721 B2* | 2/2003 | Jin et al. ................... | 349/58 |
| 6,734,926 B2 | 5/2004 | Fan et al. | |
| 6,862,053 B2* | 3/2005 | Lee et al. ................... | 349/58 |
| 7,570,316 B2* | 8/2009 | Kim ............................. | 349/58 |
| 2006/0125981 A1 | 6/2006 | Okuda | |

FOREIGN PATENT DOCUMENTS

| | | |
|---|---|---|
| CN | 1952747 A | 4/2007 |
| CN | 1971358 A | 5/2007 |
| CN | 201203734 Y | 3/2009 |
| JP | 05-333362 | 12/1993 |
| JP | 08-313907 | 11/1996 |
| JP | 10-253949 A | 9/1998 |
| JP | 2001-117093 A | 4/2001 |
| JP | 2001-147431 A | 5/2001 |
| JP | 2001-350422 A | 12/2001 |
| JP | 2003167230 A | 6/2003 |
| JP | 2005-055925 A | 3/2005 |
| JP | 2006-154008 A | 6/2006 |
| JP | 2007-033564 A | 2/2007 |
| JP | 2007-133281 A | 5/2007 |
| JP | 2009-020228 A | 1/2009 |

* cited by examiner

Primary Examiner — James Dudek

(57) ABSTRACT

A flat panel display module is introduced herein, which principally includes an upper bezel, a liquid crystal panel, a frame, an optical film set and a printed circuit board assembly (PCBA), wherein various types electrical components mounted on the PCBA are capable of being completely or mostly accommodated within a caved structure constructed within the inside of the flat panel display module so as to reduce a thickness of the whole flat panel display module. Simultaneously, a better structural strength for the whole flat panel display module can be achieved therefore by closely stacking up the above-mentioned elements of the whole flat panel display module.

17 Claims, 5 Drawing Sheets

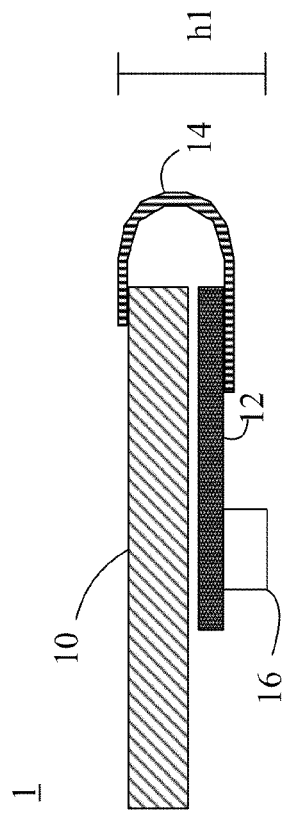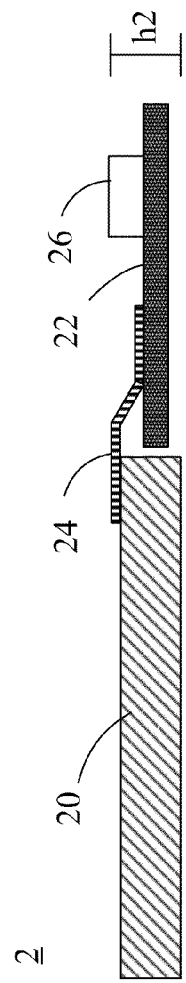
FIG. 1 (Prior Art)
FIG. 2 (Prior Art)

A-A'

FLAT PANEL DISPLAY MODULE

CLAIM OF PRIORITY

This application claims priority to Taiwanese Patent Application No. 098125073 filed on Jul. 24, 2009.

FIELD OF THE INVENTION

The present invention relates to a flat panel display module, and more particularly relates to a flat panel display module having the features of slimness and better structural strength.

BACKGROUND OF THE INVENTION

Flat panel display module is widely used in electrical products, e.g. notebook computer, with slimness size and the whole size of the flat panel display module should be meet the requirement of the specifications of the electrical products. Thus, the aspect of the flat panel display module should be made of a slim and thin structure. For an example of liquid crystal display (LCD), it is composed of LCD panel, backlight unit, and a variety of electrical components on the printed circuit board assembly (PCBA) and flexible printed circuits (FPC). Based on the flexible printed circuits (FPC), LCD panel and printed circuit board for the classification of the aspect of the LCD module, the aspect of the LCD module includes a bending type module and a plate type module. As shown in FIG. 1, it is a conventional schematic cross-sectional view of bending type display module 1. The LCD panel 10, the printed circuit board assembly (PCBA) 12, and the electrical components 16 mounted on the printed circuit board assembly (PCBA) 12 of the bending type display module 1 are stacked at a perpendicular direction (all or portions) to form a stacked thickness "h1". Two opposite end portions of a flexible printed circuit (FPC) 14 having a bending U-shape are electrically connected to the top surface of LCD panel 10 and the bottom surface of printed circuit board assembly (PCBA) 12, respectively.

As shown in FIG. 2, it is a conventional schematic cross-sectional view of plate type display module 2, which is different from the display module in FIG. 1. The LCD panel 20 and the electrical components 26 mounted on the printed circuit board assembly (PCBA) 22 of the assembled plate type display module 2 are arranged in a side-by-side status. In another conventional case, there is a step height difference between the LCD panel 20 and the printed circuit board assembly (PCBA) 22 of the assembled plate type display module 2. A flexible printed circuit (FPC) 24 is disposed between the LCD panel 20 and the printed circuit board assembly (PCBA) 22. Two opposite end portions of a flexible printed circuit (FPC) 24 are electrically connected to the top surface of LCD panel 20 and the top surface of printed circuit board assembly (PCBA) 22 respectively to form a thickness "h2" of the plate type display module 2. In FIG. 1 and FIG. 2, the LCD panel 10, the printed circuit board assembly (PCBA) 12, and the electrical components 16 of the bending type display module 1 are stacked so that the whole thickness "h1" of the bending type display module 1 is greater than the thickness of the whole thickness "h2" of the plate type display module 2, which cannot meet the requirement of the specifications of the electrical products. In addition, although the whole thickness and weight of the plate type display module 2 is better than the bending type display module 1, the LCD panel 20 and the printed circuit board assembly (PCBA) 22 is arranged in a side-by-side status, resulting in unreliable protection for the elements. Therefore, the whole structural strength and yield rate of the assembled plate type display module 2 are inferior to these of the bending type display module 1. Furthermore, the structure of the plate type display module 2 considerably occupies the space along the horizontal direction.

SUMMARY OF THE INVENTION

One objective of the present invention is to provide a flat panel display module having the features of slimness and thinness of the plate type display module and the better structural strength and yield rate of the bending type display module.

According to the above objective, the present invention sets forth a flat panel display module. The flat panel display module includes an upper bezel, a liquid crystal panel, a frame, an optical film set, and a printed circuit board assembly.

The upper bezel has a first plate surface and a second plate surface positioned in a non-coplanar status with the first plate surface, and the second plate surface forms an opening. The liquid crystal panel disposed under the first plate surface of the upper bezel. The optical film set disposed under the liquid crystal panel wherein a portion of the optical film set, the first plate surface of the upper bezel, the second plate surface of the upper bezel, and a portion of the liquid crystal panel construct a caved structure having an accommodated space. The caved structure further includes a first caved structure and a second caved structure. The printed circuit board assembly has at least one electrical component which is contained within the accommodated space of the caved structure. In one case, the electrical component includes an electrical connector, a flexible printed circuit, an active component, and/or passive component. The port unit of the electrical connector corresponds to or extends outside an opening of the second plate surface. The flexible printed circuit has a first end portion of the flexible printed circuit which is contained within the accommodated space of the first caved structure and electrically connected to the printed circuit board assembly, and the flexible printed circuit has a second end portion which is contained within the accommodated space of the second caved structure and electrically connected to the end portion of the liquid crystal panel. The frame has a first supporting portion which is contained within the first caved structure for supporting one portion of the liquid crystal panel, a second supporting portion for supporting the end portion of the optical film set, and a third supporting portion which is contained within the first caved structure for supporting the other portion of the optical film set.

The electrical components on the printed circuit board assembly (PCBA) can be accommodated within the caved structure. Therefore, the whole thickness of the assembled the flat panel display module is reduced. Moreover, the components within the flat panel display module are closely stacked and the printed circuit board assembly and electrical elements of flat panel display module are protected by the frame and upper bezel for forming a better structural strength.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1 is a conventional schematic cross-sectional view of bending type display module;

FIG. 2 is a conventional schematic cross-sectional view of plate type display module;

DETAILED DESCRIPTION OF THE PREFERRED EMBODIMENTS

Figure 3A:
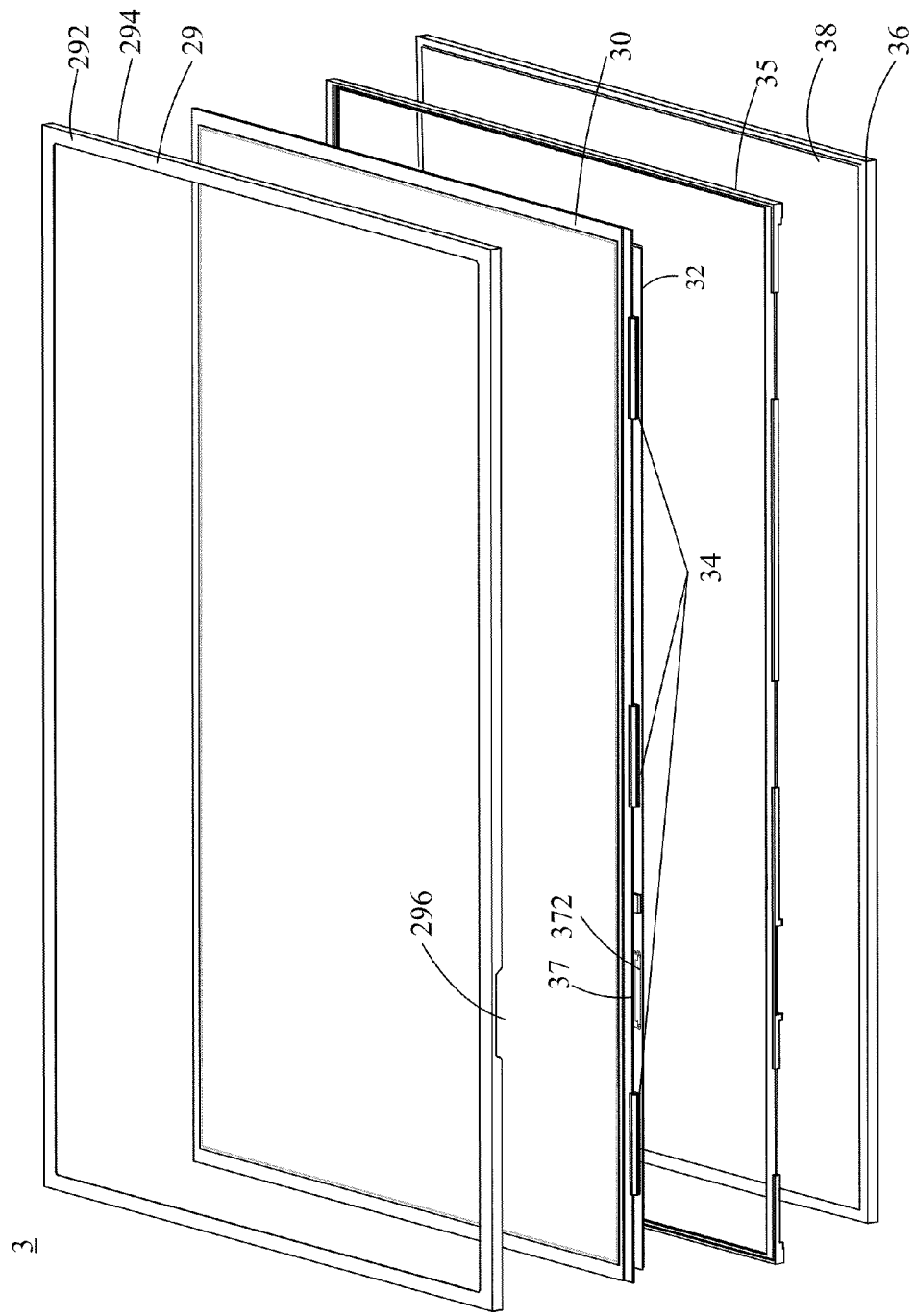
FIG. 3A is a schematic exploded view of the components of a flat panel display module according to one preferred embodiment of the present invention.
Figure 3B:
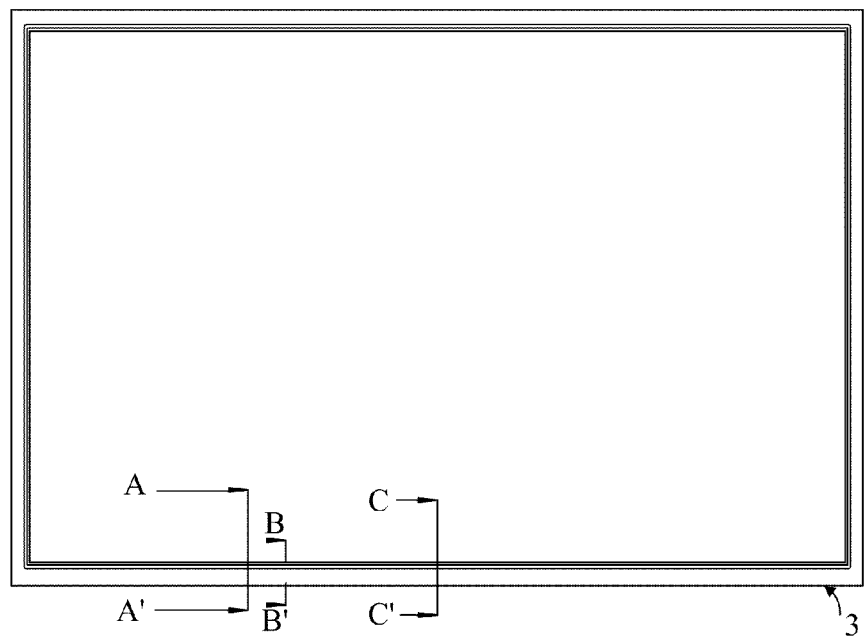
FIG. 3B is a schematic top view of the flat panel display module after assembling the components shown in FIG. 3A according to one embodiment of the present invention.

Please refer to FIG. 3A and FIG. 3B. FIG. 3A is a schematic exploded view of the components of a flat panel display module 3 according to one preferred embodiment of the present invention. FIG. 3B is a schematic top view of the flat panel display module 3 after assembling the components shown in FIG. 3A according to one embodiment of the present invention. For example, the flat panel display module 3 is liquid crystal display (LCD) module. As shown in FIG. 3A, the flat panel display module 3 includes an upper bezel 29, liquid crystal panel 30, a printed circuit board assembly (PCBA) 32, and a backlight unit 36 having a frame 35. The frame is a component of the backlight unit 36. The upper bezel 29 has a hollow structure which is composed of four sidewalls. For example, the upper bezel 29 is made of metal material, e.g. steel, which is named front metal frame of front frame. Each of the sidewall of the upper bezel 29 has a first plate surface 292 and a second plate surface 294. The first plate surface 292 is connected to the second plate surface 294 and the first plate surface 292 and the second plate surface 294 are positioned in a non-coplanar status. In one case, the first plate surface 292 and the second plate surface 294 are positioned in an inverse L-shape, and an opening 296 is formed in the second plate surface 294.

The printed circuit board assembly (PCBA) 32 has a variety of electronic components thereon, such as a plurality of flexible printed circuits (FPC) 34, tape carrier package, and/or chip-on-film (COF), an electrical connector 37, active components or passive components (not shown). In one embodiment, the electrical connector 37 is a connector having a low voltage differential signal (LVDS) or display port connector and has a port unit 372 corresponding to the opening 296 of the upper bezel 29 for transmitting the predetermined signal to the electrical devices outside the flat panel display module 3. In one case, the electrical connector 37 is a connector with surface mount technique (SMT) type or dual-in-line plug (DIP) type to be positioned on the printed circuit board assembly (PCBA) 32. The active component includes an application specific integrated circuit (ASIC), timing controller (T-CON) and/or various driving chips. The passive component includes resistor, capacitor, or inductor. The backlight unit 36 includes an optical film set 38 and light source (not shown).

Figure 4A:
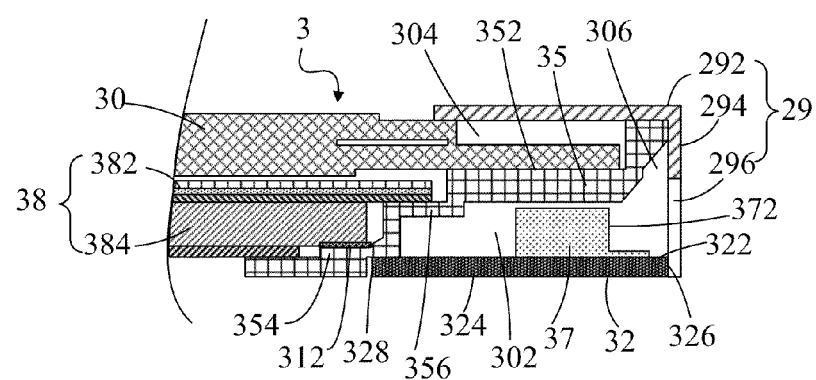
FIG. 4A is a partial schematic cross-sectional view of the flat panel display module along line A-A' shown in FIG. 3B according to one embodiment of the present invention.

Please further refer to FIG. 3A, FIG. 3B and FIG. 4A. FIG. 4A is a partial schematic cross-sectional view of the flat panel display module 3 along line A-A' shown in FIG. 3B according to one embodiment of the present invention. The line A-A' is along the electrical connector 37 of the flat panel display module 3 to clearly show the arrangement and cross-sectional structure of the electrical connector 37. As shown in FIG. 4A, the liquid crystal panel 30 is positioned under the first plate surface 292 of the upper bezel 29 and the end portion of the liquid crystal panel 30 is covered with the first plate surface 292 and the second plate surface 294 of the upper bezel 29. The frame 35 and the optical film set 38 are positioned under the liquid crystal panel 30 wherein the optical film set 38 has a plurality of optical films 382 and a light-guide plate (LGP) 384 under the optical films 382. In one case, the optical films 382 is a diffusion plate and/or brightness enhanced film (or named prism film). The frame 35 is disposed on the printed circuit board assembly (PCBA) 32. The frame 35 has a first supporting portion 352 for supporting one portion of the liquid crystal panel 30, a second supporting portion 354 for supporting the end portion of the light-guide plate (LGP) 384 of the optical film set 38, and a third supporting portion 356 for supporting the other portion of the optical film 382 of the optical film set 38. In one embodiment, the first double-sided tape 312 is used to adhere the second supporting portion 354 of the frame 35 to the under end portion of the light-guide plate (LGP) 384. It should be noted that different fasten mode in the prior art for adhesion can be used. Since the above-mentioned components are closely stacked together, the flat panel display module 3 has better structural strength in comparison with conventional bending type display module. In another case, the frame 35 can be replaced with a shading component which is positioned to the light-guide plate (LGP) 384.

The printed circuit board assembly (PCBA) 32 under the frame 35 has a first edge 326, a second edge 328, a first surface 322, and a second surface 324. The first edge 326 is adjacent to the opening 296 of the second plate surface 294 in the upper bezel 29. The second edge 328 is opposite to the first edge 326 and adjacent to the light-guide plate (LGP) 384 of the optical film set 38 and the second supporting portion 354 of the frame 35. The first surface 322 is disposed between the first edge 326 and the second edge 328 for supporting electrical components, e.g. the electrical connector 37, to correspond to the end portion of the optical film set 38. In one preferred embodiment, the electrical connector 37 is disposed to the end portion of the light-guide plate (LGP) 384.

A portion of optical film set 38, the first plate surface 292 and/or the second plate surface 294 of the upper bezel 29, and a portion of liquid crystal panel 30 construct a caved structure with an accommodated space. The caved structure further is composed of the portion of optical film set 38, the second plate surface 294 of the upper bezel 29, and a portion of liquid crystal panel 30 to construct a first caved structure 302 for containing the first supporting portion 352 and the third supporting portion 356 of the frame 35 and the first caved structure 302 links to the opening 296 of the second plate surface 294 of the upper bezel 29. The first plate surface 292 and the second plate surface 294 of the upper bezel 29 and the portion of liquid crystal panel 30 construct a second caved structure 304. A channel 306 is formed by the second plate surface 294 of the upper bezel 29 and the end portion of liquid crystal panel 30 for linking the second caved structure 304 to the accommodated space of the first caved structure 302 so that the end portion of the frame 35 is extended from the first caved structure 302 to the second caved structure 304. In other words, the portion of optical film set 38, the first plate surface 292 of the upper bezel 29, the second plate surface 294 of the upper bezel 29, and the portion of liquid crystal panel 30 construct a caved structure with the accommodated space. As shown in FIG. 4A, a variety of electrical components, e.g. electrical connectors 37, on the first surface 322 of the printed circuit board assembly (PCBA) 32 can be accommodated within the first caved structure 304 formed by the optical film set 38 and the first caved structure 302 of the second plate surface 294. Thus, the port unit 372 of the electrical connectors 37 corresponds to the opening 296 of the second plate surface 294 of the upper bezel 29 for electrically connecting the electrical devices outside the flat panel display module 3. The opposite side of the electrical 37 and the opening 296 of the second panel plate 294 corresponds to the end portion of the optical film set 38. Therefore, such a structure is capable of protecting the electrical connector 37 from external interference and reducing the whole thickness of the assembled flat panel display module 3.

Figure 4B:
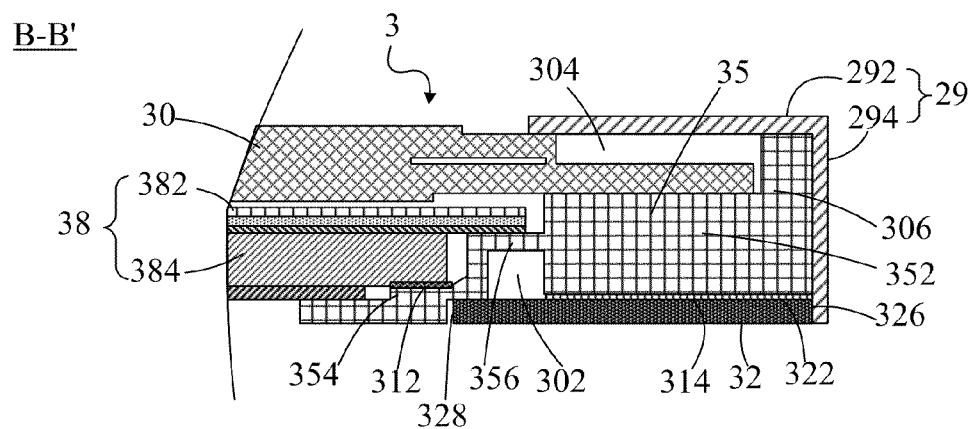
FIG. 4B is a partial schematic cross-sectional view of the flat panel display module along line B-B' shown in FIG. 3B according to one embodiment of the present invention.

Please further refer to FIG. 3A, FIG. 3B and FIG. 4B. FIG. 4B is a partial schematic cross-sectional view of the flat panel display module 3 along line B-B' shown in FIG. 3B according to one embodiment of the present invention. The arrangement and cross-sectional structure of the frame 35 on the flat panel display module 3 are shown clearly. In comparison with FIG. 4A, the difference is: as shown in FIG. 4B, the first caved structure 302 contains the first supporting portion 352 and the third supporting portion 356 to exclude the electrical components and the second plate surface 294 has no opening. Further, besides the first double-sided tape 312 is used to adhere the second supporting portion 354 of the frame 35 to the under end portion of the light-guide plate (LGP) 384, the cross-sectional bottom area of the first supporting 352 in the frame 35 is greater than that shown in FIG. 4A so that the second double-sided tape 314 stably adheres the frame 35 to the first surface 322 of the printed circuit board assembly (PCBA) 32. In another cases, the frame 35 can be fastened on the printed circuit board assembly (PCBA) 32 by screws and/or hook units. The rest arrangement of components in FIG. 4B is the same as the arrangement in FIG. 4A and thus omitted herein.

Figure 4C:
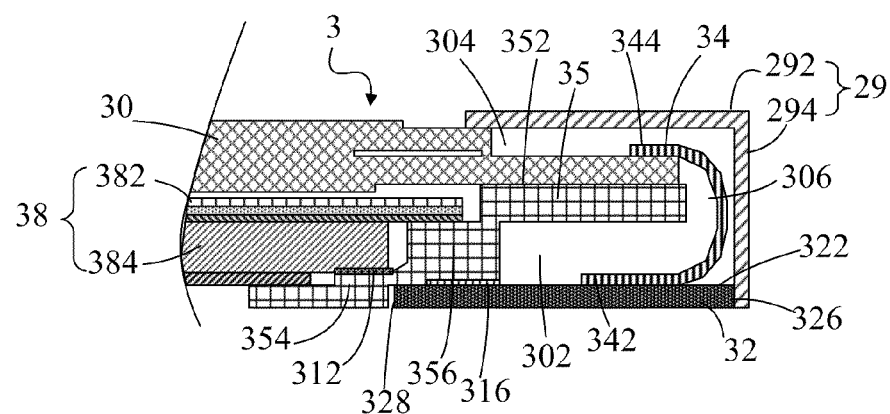
FIG. 4C is a partial schematic cross-sectional view of the flat panel display module along line C-C' shown in FIG. 3B according to one embodiment of the present invention.

Please further refer to FIG. 3A, FIG. 3B and FIG. 4C. FIG. 4C is a partial schematic cross-sectional view of the flat panel display module 3 along line C-C' shown in FIG. 3B according to one embodiment of the present invention. The line C-C' is along the flexible printed circuit (FPC) 34 on the flat panel display module 3 to clearly show the arrangement and cross-sectional structure of the flexible printed circuit (FPC) 34. In comparison with FIG. 4A, the difference is: as shown in FIG. 4C, the flexible printed circuit (FPC) 34 is arranged in form of U-shape and has a first end portion 342 and a second end portion 344. The first end portion 342 of the flexible printed circuit (FPC) 34 is contained within the accommodated space of the first caved structure 302 and electrically connected to the first surface 322 of the printed circuit board assembly (PCBA) 32. The second end portion 344 of the flexible printed circuit (FPC) 34 is contained within the accommodated space of the second caved structure 304 and electrically connected onto the end portion of the liquid crystal panel 30. The flexible printed circuit (FPC) 34 is extended through the channel 306 to the first caved structure 302 and the second caved structure 304. In addition, the second plate surface 294 of the upper bezel 29 has no opening and the second plate surface 294 covers the end portion of liquid crystal panel 30, the end portion of frame 35 and the first edge 326 of the printed circuit board assembly (PCBA) 32 so that flexible printed circuit (FPC) 34 is contained within the end portion of liquid crystal panel 30, the end portion of frame 35, the first caved structure 302 and the second caved structure 304 formed by the optical film set 38 and the second plate surface 294, and the channel 306. Therefore, such a structure is capable of protecting the flexible printed circuit (FPC) 34 from external interference and reducing the whole thickness of the assembled flat panel display module 3. As shown in FIG. 4C, besides the first double-sided tape 312 is used to adhere the second supporting portion 354 of the frame 35 to the under end portion of the light-guide plate (LGP) 384, the cross-sectional bottom area of the third supporting 356 in the frame 35 is greater than that shown in FIG. 4A so that the third double-sided tape 316 stably adheres the frame 35 to the first surface 322 of the printed circuit board assembly (PCBA) 32. In another cases, the frame 35 can be fastened on the printed circuit board assembly (PCBA) 32 by screws and/or hook units. The rest arrangement of components in FIG. 4C is the same as the arrangement in FIG. 4A and thus omitted herein.

Figure 5:
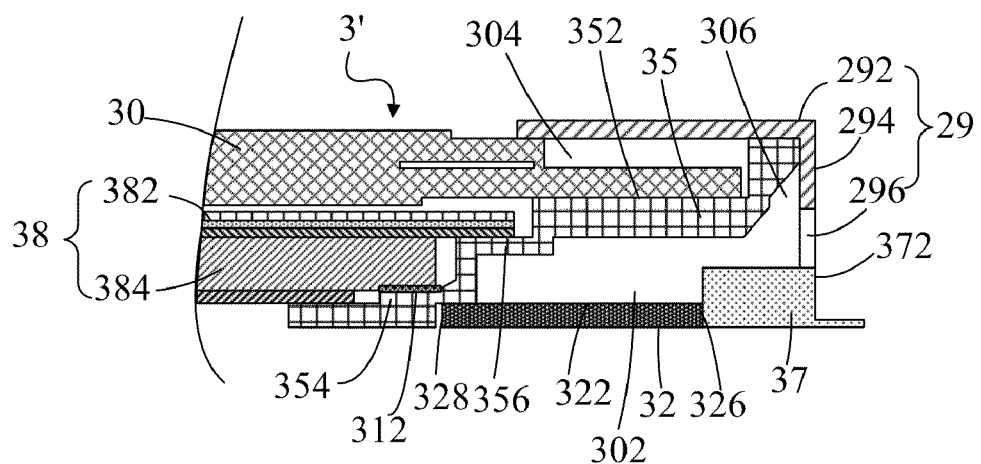
FIG. 5 is a schematic view of a flat panel display module according to another embodiment of the present invention, which shows a partial schematic cross-sectional view of the flat panel display module along line A-A' shown in FIG. 3B.

Please refer to FIG. 5. FIG. 5 is a schematic view of a flat panel display module 3' according to another embodiment of the present invention, which shows a partial schematic cross-sectional view of the flat panel display module 3' along line A-A' shown in FIG. 3B. In comparison with FIG. 4A, the difference is: as shown in FIG. 5, the electrical connector 37 is positioned in the end portion of the first edge 326 of the printed circuit board assembly (PCBA) 32. The port unit 372 extends outside the opening 296 of the second plate surface 294 in the upper bezel 29 but the greater portion of the electrical connector 37 is contained within the accommodated space of the first caved structure 302. The rest arrangement of components in FIG. 5 is the same as the arrangement in FIG. 4A and thus omitted herein.

It should be noted that a portion or the greater portion of the electrical connector 37, frame 35 and the flexible printed circuit (FPC) 34 are accommodated within the caved structure including first and second caved structures 302, 304 and/or channel 306. However, a variety of electrical components, e.g. active components and/or passive components, on the printed circuit board assembly (PCBA) 32 can be accommodated within the caved structure, including first and second caved structures 302, 304 and/or channel 306, of the flat panel display module 3, 3'. Therefore, the whole thickness of the assembled the flat panel display module 3, 3' is reduced so that thickness is the same as the thickness of the conventional plate type module for the purpose of thinness. Moreover, the components within the flat panel display module 3, 3' are closely stacked and the printed circuit board assembly and electrical elements of flat panel display module are protected by the frame 35 and upper bezel 29 for forming a better structural strength.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:
1. A flat panel display module, comprising:
an upper bezel having a first plate surface and a second plate surface positioned in a non-coplanar status with the first plate surface;
a liquid crystal panel disposed under the first plate surface of the upper bezel;
an optical film set disposed under the liquid crystal panel, wherein a portion of the optical film set, the first plate surface of the upper bezel, the second plate surface of the upper bezel, and a portion of the liquid crystal panel construct a caved structure having an accommodated space; and a printed circuit board assembly having at least one electrical component which is contained within the accommodated space of the caved structure, wherein the printed circuit board assembly is disposed under the liquid crystal panel and has a first edge which is adjacent to the second plate surface of the upper bezel, a second edge which is opposite to the first edge and adjacent to optical film set, a first surface which is positioned between the first edge and the second edge for supporting the electrical component and opposite to the first caved structure, and a second surface which is opposite to the first surface.

2. The flat panel display module of claim 1, wherein the caved structure further comprises the portion of optical film set, the second plate surface of the upper bezel and the portion of liquid crystal panel to construct a first caved structure, the first plate surface and the second plate surface of the upper bezel and the portion of liquid crystal panel construct a second caved structure, and a channel is formed by the second plate surface of the upper bezel and the portion of liquid crystal panel for linking the second caved structure to the accommodated space of the first caved structure.

3. The flat panel display module of claim 2, wherein the electrical component is accommodated within the first caved structure.

4. The flat panel display module of claim 3, wherein the electrical component further comprises an active component or a passive component.

5. The flat panel display module of claim 3, wherein the second plate surface of the upper bezel further comprises an opening to be linked to the first caved structure.

6. The flat panel display module of claim 5, wherein the electrical component further comprises an electrical connector having a port unit corresponding to the opening of the second plate surface of the upper bezel.

7. The flat panel display module of claim 2, wherein the electrical component further comprises a flexible printed circuit having a first end portion of the flexible printed circuit which is contained within the accommodated space of the first caved structure and electrically connected to the printed circuit board assembly, and having a second end portion which is contained within the accommodated space of the second caved structure and electrically connected to the end portion of the liquid crystal panel.

8. The flat panel display module of claim 2, further comprising a frame having a first supporting unit which is contained within the first caved structure for supporting one portion of the liquid crystal panel, a second supporting unit for supporting the end portion of the optical film set, and a third supporting unit which is contained within the first caved structure for supporting the other portion of the optical film set.

9. A flat panel display module, comprising:
a printed circuit board assembly;
a fame disposed on the printed circuit board assembly and having a first supporting portion and a second supporting portion;
a liquid crystal panel disposed on the first supporting portion of the frame;
an optical film set disposed on the second supporting portion of the frame;
a flexible printed circuit electrically connected to the liquid crystal panel and the printed circuit board assembly; and
an upper bezel having a first plate surface and a second plate surface wherein the first plate surface is disposed above the liquid crystal panel, the first plate surface is connected to the second plate surface for protecting an end portion of the liquid crystal panel, an end portion of the frame, an end portion of the printed circuit board assembly, and the flexible printed circuit;
wherein the printed circuit board assembly further comprises an electrical connector having a port unit corresponding to the opening of the second plate surface.

10. The flat panel display module of claim 9, wherein the printed circuit board assembly further comprises an electrical component corresponding to an end portion of the optical film set.

11. The flat panel display module of claim 9, wherein the second plate surface further comprises an opening corresponding to an end portion of the optical film set.

12. The flat panel display module of claim 11, wherein the port unit of the electrical connector extends outside an opening of the second plate surface.

13. The flat panel display module of claim 9, wherein the optical film set further comprises a light-guide plate and a plurality of optical films, and the light-guide plate is disposed on the second supporting portion and the optical films are disposed on the light-guide plate.

14. A flat panel display module, comprising:
a printed circuit board assembly having a first surface, a second surface corresponding to the first surface, and an electrical component disposed on the first surface;
a fame disposed on the printed circuit board assembly;
an optical film set disposed on the frame wherein an end portion of the optical film set corresponds to the electrical component;
a liquid crystal panel disposed on the frame and the optical film set; and
an upper bezel having a first plate surface and a second plate surface, wherein the first plate surface is disposed above the liquid crystal panel and the first plate surface is connected to the second plate surface, for covering an end portion of the liquid crystal panel, an end portion of the frame, and an end portion of the printed circuit board assembly for protecting the electrical component;
wherein the electrical component further comprises a port unit corresponding to the opening of the second plate surface.

15. The flat panel display module of claim 14, further comprising a flexible printed circuit connected to the liquid crystal panel and the first surface of the printed circuit board assembly.

16. The flat panel display module of claim 14, wherein the second plate surface further comprises an opening corresponding to an end portion of the optical film set.

17. The flat panel display module of claim 16, wherein the port unit of the electrical connector extends outside an opening of the second plate surface.

* * * * *